(12) United States Patent
Imanishi et al.

(10) Patent No.: US 10,816,084 B2
(45) Date of Patent: Oct. 27, 2020

(54) VEHICLE POWER TRANSMISSION DEVICE

(71) Applicant: TOYOTA JIDOSHA KABUSHIKI KAISHA, Toyota-shi, Aichi (JP)

(72) Inventors: Ryohei Imanishi, Toyota (JP); Hirofumi Fujita, Okazaki (JP); Yuji Inoue, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 16/107,285

(22) Filed: Aug. 21, 2018

(65) Prior Publication Data

US 2019/0056025 A1  Feb. 21, 2019

(30) Foreign Application Priority Data

Aug. 21, 2017  (JP) .................................. 2017-158948

(51) Int. Cl.
*F16H 57/04*  (2010.01)
*F16H 48/08*  (2006.01)

(52) U.S. Cl.
CPC ..... *F16H 57/0428* (2013.01); *F16H 57/0483* (2013.01); *F16H 48/08* (2013.01); *F16H 57/0409* (2013.01)

(58) Field of Classification Search
None
See application file for complete search history.

(56) References Cited

U.S. PATENT DOCUMENTS

| | | | |
|---|---|---|---|
| 3,138,222 A * | 6/1964 | Dames | F16H 57/0483 184/11.2 |
| 9,309,959 B2 * | 4/2016 | Ishikawa | F16H 57/027 |
| 9,435,421 B2 * | 9/2016 | Mafune | F16H 57/0409 |
| 9,933,066 B2 * | 4/2018 | Sada | F16H 57/0447 |
| 10,408,336 B2 * | 9/2019 | Nadayoshi | F16H 48/08 |
| 2017/0102065 A1 | 4/2017 | Ohmura et al. | |
| 2018/0106357 A1 | 4/2018 | Kawakami et al. | |

FOREIGN PATENT DOCUMENTS

| | | | |
|---|---|---|---|
| JP | 2016-041979 A | 3/2016 | |
| JP | 2018-063037 A | 4/2018 | |
| WO | WO-2015146633 A1 * | 10/2015 | F16H 57/0453 |

* cited by examiner

*Primary Examiner* — Ernesto A Suarez
*Assistant Examiner* — James J Taylor, II
(74) *Attorney, Agent, or Firm* — Oliff PLC (57) ABSTRACT

A vehicle power transmission device includes: a differential mechanism and provided with a through-hole in an outer circumferential surface, a pair of pinion gears respectively fitted to both ends of a pinion shaft, and a pair of side gears rotatably supported by the differential case and meshed with the pinion gears; and a baffle plate that includes an oil passage component functioning as an oil passage for supplying a lubricating oil for lubricating the pinion gears and the side gears and that is fixedly disposed to cover an outer circumference of the differential case. The oil passage component is provided with an opening portion allowing the lubricating oil in the oil passage to flow out downward, and the opening portion is disposed above the pinion shaft and between a pair of inner-circumferential-side end surfaces of the pair of the pinion gears when the pinion shaft is horizontal.

12 Claims, 6 Drawing Sheets

VEHICLE POWER TRANSMISSION DEVICE

This application claims priority from Japanese Patent Application No. 2017-158948 filed on Aug. 21, 2017, the disclosure of which is herein incorporated by reference in its entirety.

TECHNICAL FIELD

The present invention relates to a vehicle power transmission device and, more particularly, to a vehicle power transmission device including a baffle plate having an oil passage for supplying a lubricating oil to a differential mechanism.

BACKGROUND ART

A vehicle power transmission device is known that comprises (a) a differential mechanism including a differential case rotatably disposed around a rotation axis and having a through-hole in an outer circumferential surface, a pair of pinion gears respectively fitted to both ends of a pinion shaft fixed to the differential case, and a pair of side gears rotatably supported by the differential case and meshed with the pinion gears; (b) an oil passage fixedly disposed to cover an outer circumference of the differential case for supplying a lubricating oil for lubricating the pinion gears and the side gears; and (c) a positionally-fixed baffle plate covering the differential case. For example, this corresponds to a vehicle power transmission device described in Patent Document 1.

In the vehicle power transmission device described in Patent Document 1, the lubricating oil is supplied through a lubricating-oil supply pipe to the differential mechanism. Specifically, the lubricating oil is supplied from an oil passage formed in an outer case housing the differential mechanism to the lubricating-oil supply pipe disposed inside the differential case and is further supplied from the lubricating-oil supply pipe to the differential mechanism. As a result, the lubricating oil can directly be supplied from the outside of the differential mechanism through the lubricating-oil supply pipe into the differential mechanism.

PRIOR ART DOCUMENT

Patent Document

Patent Document 1: Japanese Laid-Open Patent Publication No. 2016-041979

SUMMARY OF THE INVENTION

Technical Problem

To prevent power transmission efficiency of the differential mechanism from deteriorating due to a stirring resistance of the pinion gears or the side gears, the vehicle power transmission device is provided with, for example, a baffle plate covering the outer circumference of the differential mechanism so as not to allow the lubricating oil splashing from the periphery of the differential mechanism to flow into the differential mechanism. In this case, the vehicle power transmission device of Patent Document 1 possibly has the baffle plate interposed between the oil passage formed in the outer case and the lubricating-oil supply pipe, and the baffle plate may interfere with the supply of the lubricating oil.

On the other hand, it is conceivable that a vehicle power transmission device with a baffle plate disposed on the outer circumference of the differential mechanism has a structure in which an oil passage is formed in the baffle plate to supply a lubricating oil to the differential mechanism without passing through a lubricating-oil supply pipe. As a result, the lubricating oil is discharged from an opening portion of the oil passage integrally disposed in the baffle plate to the differential mechanism, and therefore, the lubricating oil can be supplied to the differential mechanism without interference with the supply of the lubricating oil by the baffle plate. However, if a force for discharging the lubricating oil from the opening portion of the oil passage to the differential mechanism becomes not enough for the lubricating oil, i.e., when the resistance increases in the oil passage due to a higher viscosity of the lubricating oil at low temperature, the lubricating oil may not be injected from the opening portion of the oil passage and may drip down along a wall surface of the oil passage. Therefore, the discharge direction of the lubricating oil is not fixed so that the lubricating oil may not stably be supplied to the differential mechanism.

The present invention was conceived in view of the situations and it is therefore an object of the present invention to provide a vehicle power transmission device including a baffle plate integrated with an oil passage, which is configured to supply the lubricating oil into the differential mechanism efficiently and stably.

Solution to Problem

To achieve the above object, a first aspect of the present invention provides a vehicle power transmission device comprising: (a) a differential mechanism including a differential case rotatably disposed around a rotation axis and provided with a through-hole in an outer circumferential surface, a pair of pinion gears respectively fitted to both ends of a pinion shaft fixed to the differential case, and a pair of side gears rotatably supported by the differential case and meshed with the pinion gears; and (b) a baffle plate that includes an oil passage component functioning as an oil passage for supplying a lubricating oil for lubricating the pinion gears and the side gears and that is fixedly disposed to cover an outer circumference of the differential case, wherein (c) the oil passage component is provided with an opening portion allowing the lubricating oil in the oil passage to flow out downward, and wherein (d) the opening portion is disposed above the pinion shaft and between a pair of inner-circumferential-side end surfaces of the pair of the pinion gears facing each other when the pinion shaft is horizontal.

A second aspect of the present invention provides the vehicle power transmission device recited in the first aspect of the invention, wherein the oil passage component is integrally included in the baffle plate.

A third aspect of the present invention provides the vehicle power transmission device recited in the second aspect of the invention, wherein the baffle plate and the oil passage component are each made of a resin material.

A fourth aspect of the present invention provides the vehicle power transmission device recited in any one of the first to third aspects of the invention, wherein the opening portion includes an opening hole a hole diameter of which is smaller than the inner diameter of the oil passage.

A fifth aspect of the present invention provides the vehicle power transmission device recited in the fourth aspect of the invention, wherein (a) the opening portion is provided with a guide dripping the lubricating oil flowing out from the opening hole, and wherein (b) the guide is disposed above the pinion shaft and between the inner-circumferential-side end surfaces of the pinion gears when the pinion shaft is horizontal.

A sixth aspect of the present invention provides the vehicle power transmission device recited in the fifth aspect of the invention, wherein the guide has a cylindrical projection projecting in a direction of an axial center line of the opening hole, and wherein a tip portion of the cylindrical projection is formed into a tapered shape with a thickness dimension increasing from a tip toward the opening hole.

A seventh aspect of the present invention provides the vehicle power transmission device recited in the sixth aspect of the invention, wherein the tapered tip portion of the cylindrical projection is formed into a tapered surface having a minimum angle to be larger than 0 degrees relative to a horizontal line while the baffle plate and the differential mechanism are assembled to a vehicle.

Advantageous Effects of Invention

According to the first aspect of the invention, the vehicle power transmission device has the oil passage component included in the baffle plate, and the oil passage component is provided with the opening portion allowing the lubricating oil in the oil passage to flow out downward. The opening portion is disposed above the pinion shaft and between a pair of the inner-circumferential-side end surfaces of the pair of the pinion gears facing each other when the pinion shaft is horizontal. As a result, when the through-hole is located between the opening portion and the differential mechanism, since no obstruction interfering with the supply of the lubricating oil exists therebetween, the vehicle power transmission device can supply the lubricating oil to the differential mechanism without waste, and since the opening portion is disposed above the pinion shaft and between the pair of the inner-circumferential-side end surfaces of the pair of the pinion gears facing each other when the pinion shaft is horizontal, the lubricating oil can be allowed to flow out downward and supplied to the pinion shaft. Therefore, the vehicle power transmission device can efficiently and stably supply the lubricating oil to the differential mechanism.

According to the second aspect of the invention, the oil passage component is integrally included in the baffle plate. As a result, when the through-hole is located between the opening portion and the differential mechanism, the vehicle power transmission device has no obstruction interfering with the supply of the lubricating oil therebetween, and the oil passage component is easily attached along with the baffle plate. Therefore, the assembly workability of the vehicle power transmission device is improved, and the vehicle power transmission device can supply the lubricating oil to the differential mechanism without waste.

According to the third aspect of the invention, the baffle plate and the oil passage component are each made of a resin material. As a result, for example, even the baffle plate and the oil passage component having complicated shapes can inexpensively be formed as compared to metal materials, so that the vehicle power transmission device can be reduced in cost.

According to the fourth aspect of the invention, the opening portion includes the opening hole a hole diameter of which is smaller than the inner diameter of the oil passage. As a result, the lubricating oil flowing through the oil passage is injected from the opening hole and supplied to the pinion shaft, so that the vehicle power transmission device can reliably supply the lubricating oil to the pinion shaft.

According to the fifth aspect of the invention, the opening portion is provided with the guide dripping the lubricating oil flowing out from the opening hole, and the guide is disposed above the pinion shaft and between the inner-circumferential-side end surfaces of the pinion gears when the pinion shaft is horizontal. As a result, the lubricating oil can more reliably be supplied to the pinion shaft if the lubricating oil is not injected from the opening portion so that the lubricating oil is dripped from the opening portion. Therefore, the vehicle power transmission device can more efficiently and stably supply the lubricating oil to the differential mechanism.

According to the sixth aspect of the invention, the guide has the cylindrical projection projecting in the direction of the axial center line of the opening hole, and the tip portion of the cylindrical projection is formed into a tapered shape with a thickness dimension increasing from the tip toward the opening hole. As a result, if the lubricating oil is not injected from the opening portion so that the lubricating oil is dripped from the opening portion, the lubricating oil is allowed to seep out along the bore wall surface of the cylindrical projection, and the lubricating oil is more reliably supplied by the tip portion of the tapered cylindrical projection to the pinion shaft. Therefore, the vehicle power transmission device can more efficiently and stably supply the lubricating oil to the differential mechanism.

According to the seventh aspect of the invention, the tapered tip portion of the cylindrical projection is formed into the tapered surface having a minimum angle to be larger than 0 degrees relative to the horizontal line while the baffle plate and the differential mechanism are assembled to the vehicle. As a result, the vehicle power transmission device can supply the lubricating oil to the pinion shaft by dripping the oil more reliably onto the pinion shaft without causing the lubricating oil to run along the periphery of the outer circumference of the cylindrical projection.

MODES FOR CARRYING OUT THE INVENTION

The present invention is applied to an engine-driven vehicle and may also be applied to a hybrid vehicle having a rotating machine for running, i.e., an electric motor for driving, along with an engine serving as drive power sources for running, and an electric vehicle including only an electric motor as a drive power source, etc. A transversely-mounted transaxle such as an FF (front-engine front-drive) type of vehicle power transmission device in which multiple shafts are arranged along a vehicle width direction is preferably used, but other types of vehicle power transmission devices such as an FR (front-engine rear-drive) type or a four-wheel drive type may be used.

Examples of present invention will now be described in detail with reference to the drawings. In the following examples, the figures are simplified or deformed as needed and portions are not necessarily precisely drawn in terms of dimension ratio, shape, etc.

Example 1

Figure 1:
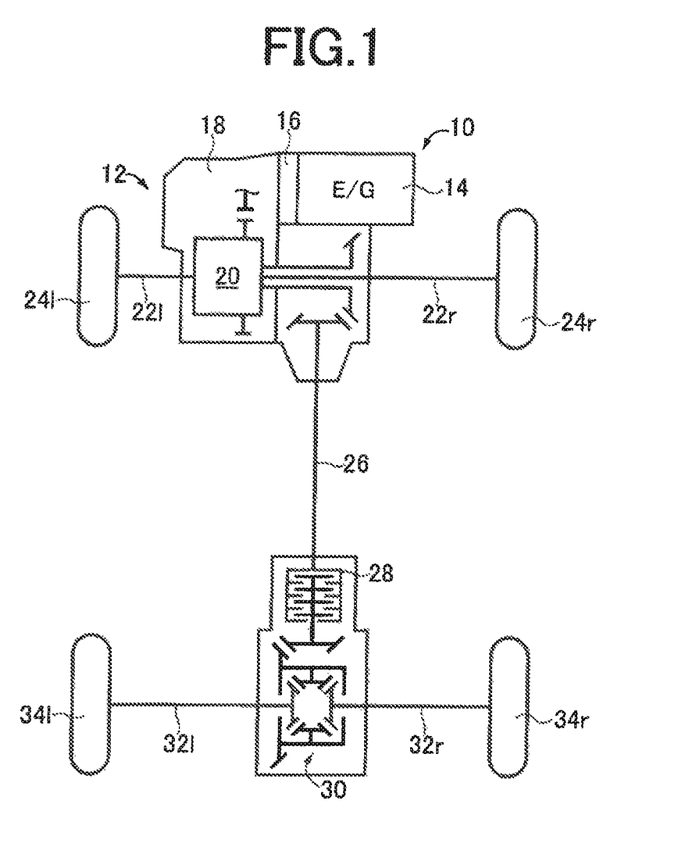
FIG. 1 is a skeleton diagram for explaining a general configuration of a vehicle to which a vehicle power transmission device of the present invention is applied.

FIG. 1 is a skeleton diagram for explaining a configuration of a vehicle power transmission device 12 included in a front-and-rear-wheel drive vehicle 10 (hereinafter referred to as a vehicle 10) based on front-engine front-wheel drive, to which the present invention is preferably applied. In the vehicle power transmission device 12 shown in FIG. 1, a drive torque generated by an engine 14 functioning as a drive source is transmitted through a torque converter 16, a transmission 18, a front-wheel differential device 20 (hereinafter simply referred to as a differential device (vehicle differential device) 20), and a pair of front-wheel axles 22*l* and 22*r* (hereinafter referred to as a pair of drive shafts 22*l* and 22*r*) to a pair of front wheels 24*l* and 24*r*. In the vehicle power transmission device 12, the drive torque is also transmitted through a propeller shaft 26 that is a drive torque transmission shaft, an electronic control coupling 28 that is a front and rear wheel drive power distribution device, a rear-wheel differential device 30, and a pair of rear-wheel axles 32*l* and 32*r* (hereinafter referred to as a pair of drive shafts 32*l* and 32*r*) to a pair of rear wheels 34*l* and 34*r*. The differential device 20 and the rear-wheel differential device 30 function as differential mechanisms generating a differential action with a planetary gear mechanism, and in this example, the differential device 20 will be described.

Figure 2:
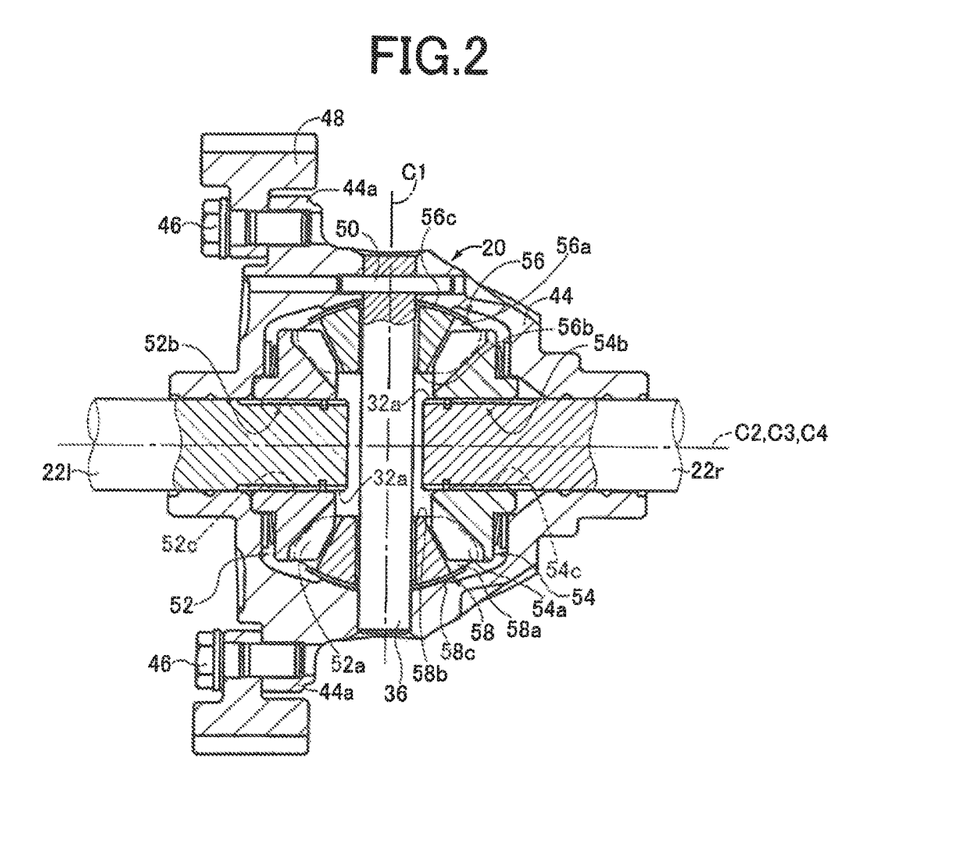
FIG. 2 is a cross-sectional view for explaining a configuration of a differential mechanism of FIG. 1.

FIG. 2 is a cross-sectional view taken along a plane including an axial center C1 of a pinion shaft 36 and an axial center C2 of the pair of drive shafts 22*l* and 22*r* to show the configuration of the differential device 20. As shown in FIG. 2, the differential device 20 includes a container-like differential case 44 rotatably supported by a housing that is a non-rotating member not shown around a rotation axial center (rotation axis) C3 substantially the same as the axial center C2, and a ring gear 48 that is fixed to an outer circumferential portion 44*a* of the differential case 44 by bolts 46. The differential device 20 includes a columnar pinion shaft 36 supported at both end portions by the differential case 44 and fixed to the differential case 44 by a knock pin 50 in a posture orthogonal to the rotation axial center C3 of the differential case 44. The differential device 20 also includes a pair of side gears 52 and 54 that are disposed freely pivotally around an axial center C4 in a facing state across the pinion shaft 36 and that are housed in the differential case 44, and a pair of pinion gears 56 and 58 rotating together with the differential case 44 in a state of being rotatably supported by the pinion shaft 36 due to insertion of the pinion shaft 36 into the pinion gears 56 and 58 and having outer circumferential teeth 56*a* and 58*a* meshed with outer circumferential teeth 52*a* and 54*a* of the pair of the side gears 52 and 54, and distributes driving torque input to the differential case to the pair of drive shafts 22*l* and 22*r*.

As shown in FIG. 2, spline grooves 32*a* are respectively formed on outer circumferences of shaft end portions of the drive shafts 22*l* and 22*r* on the pinion shaft 36 side. The pair of the side gears 52 and 54 have fitting holes 52*b* and 54*b* with inner circumferential portions provided with spline teeth 52*c* and 54*c* meshed with the spline grooves 32*a* of the drive shafts 22*l* and 22*r*.

The pair of the drive shafts 22*l* and 22*r* are fitted such that the spline grooves 32*a* of the pair of the drive shafts 22*l* and 22*r* are meshed with the spline teeth 52*c* and 54*c* of the pair of the side gears 52 and 54, respectively. Therefore, the pair of drive shafts 22*l* and 22*r* are fitted relatively non-rotatably with respect to the side gears 52 and 54 and movably in the axial center C4 direction of the side gears 52 and 54, into the fitting holes 52*b* and 54*b* of the pair of the side gears 52 and 54, respectively. The axial center C2 of the drive shafts 22*l* and 22*r* and the axial center C4 of the side gears 52 and 54 are disposed on substantially the same axial center.

Figure 3:
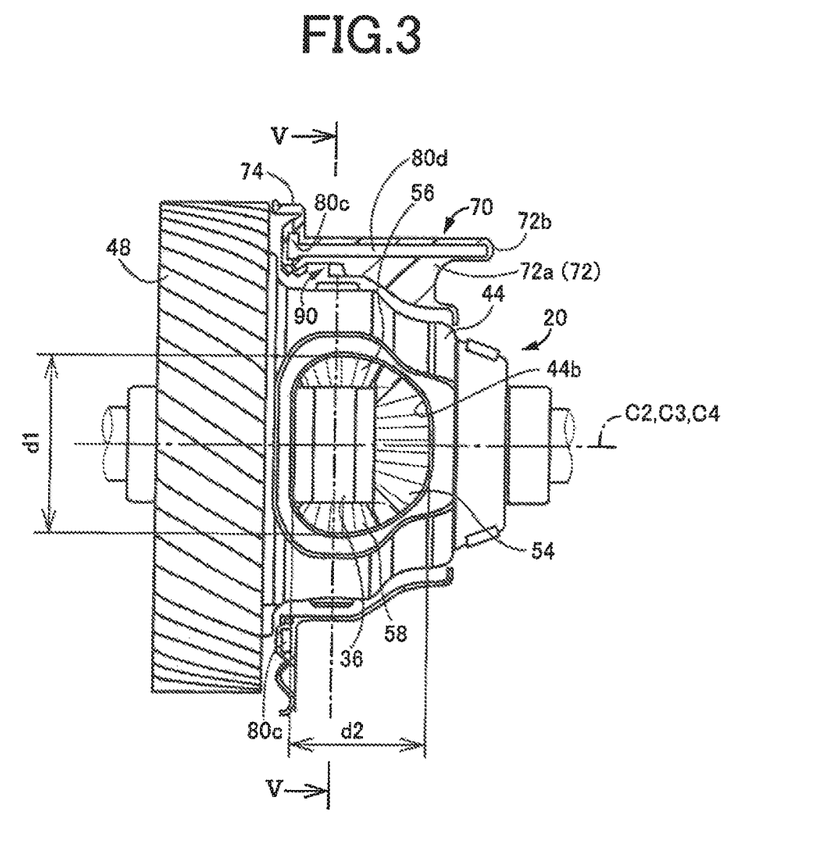
FIG. 3 is a side view of main portions of the differential mechanism and a baffle plate.
Figure 4:
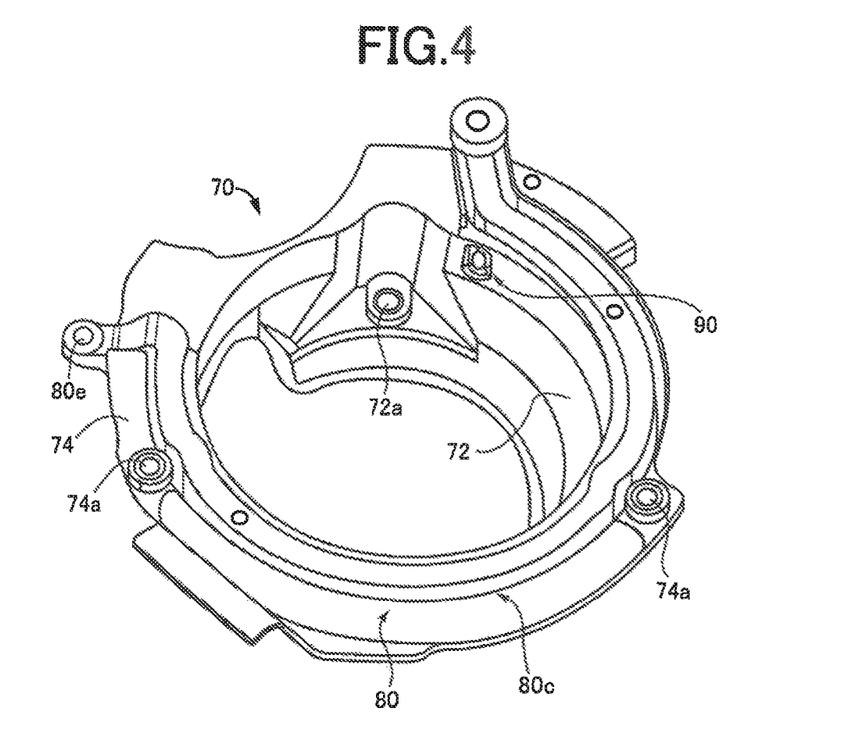
FIG. 4 is a perspective view of the main portion of the baffle plate.
Figure 5:
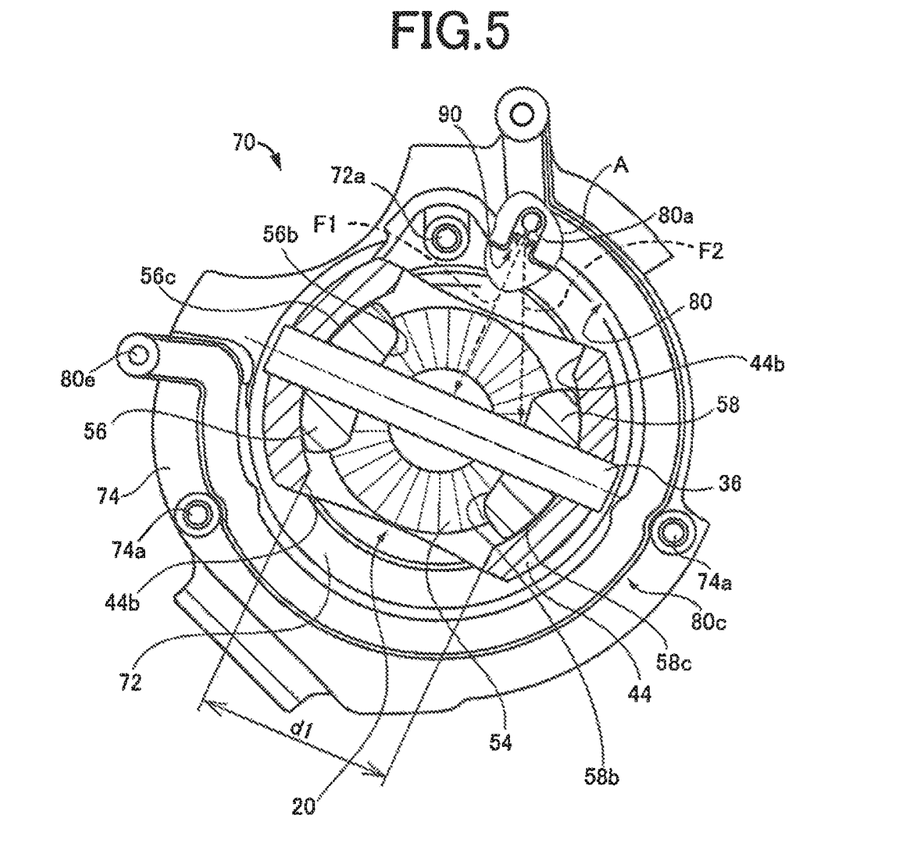
FIG. 5 is a view of the main portions of the differential mechanism and the baffle plate and shows the differential mechanism as a cross-sectional view taken along V-V of FIG. 3 and the baffle plate as the main portion viewed from an end surface side of the baffle plate on the ring gear side in FIG. 3.

FIG. 3 is a side view of main portions of the differential device 20 and a baffle plate 70 as viewed from horizontal direction. Specifically, FIG. 3 shows a side view of a state in which the baffle plate 70 is fixed to a housing that is a non-rotating member not shown on an outer circumference of the differential device 20, and the baffle plate 70 is shown as a cross section. FIG. 4 is a perspective view of a main portion of the baffle plate 70. FIG. 5 is a view of main portions of the differential device 20 and the baffle plate 70, in which the differential device 20 is shown with a cross-sectional view taken along V-V of FIG. 3 and the main portion of the baffle plate 70 is shown as viewed from an end surface side of the baffle plate 70 on the ring gear 48 side in FIG. 3. In a portion of FIG. 5, an opening portion 90 formed in an oil passage component 80 described later is shown as a transparent view. The oil passage component 80 and the baffle plate 70 are each made of a resin material.

As shown in FIGS. 3 to 5, the baffle plate 70 is formed in a hat shape or an annular shape to cover the outer circumferential surface of the differential device 20, or specifically, an outer circumferential surface of the differential case 44. As shown in FIGS. 3 to 5, the baffle plate 70 is made up of a main body 72 and a flange 74. Multiple fastening holes are formed in the baffle plate 70, and the baffle plate 70 of this example has one fastening hole 72*a* formed in the main body 72 and two fastening holes 74*a* formed in the flange 74. Fastening bolts not shown are inserted through the fastening holes 72*a*, 74*a*, and the fastening bolts are respectively fastened to fastening portions not shown formed in the housing not shown, for example. In an outer circumferential wall of the differential case 44, two through-holes 44*b* are formed at equal intervals in a circumferential direction so that a lubricating oil to be injected or dripped from the baffle plate 70 described later is directly supplied to the pinion shaft 36 etc. The through-holes 44*b* have a size allowing passage of the side gears 52, 54 and the pinion gears 56, 58 during assembling. As shown in FIGS. 3 and 5, the through-holes 44*b* are parallel to the axial center C1 of the pinion shaft 36 and have a long diameter d1 larger than the distance between a pair of inner-circumferential-side end surfaces 56*b*, 58*b* of the pinion gears 56, 58 facing each other and smaller than the distance between opposite outer-circumferential-side end surfaces 56*c*, 58*c* of the pinion gears 56, 58. As shown in FIG. 3, the through-holes 44*b* have a short diameter d2 with a size including the inner-circumferential-side end surfaces 56*b*, 58*b* of the pinion gears 56, 58 and a portion of the side gears 52, 54 when viewed in a direction orthogonal to the rotation axis C3 of the differential case 44.

As shown in FIGS. 3 and 4, the main body 72 of the baffle plate 70 is formed into a substantially cylindrical shape having therein a space capable of covering the differential case 44 at a predetermined interval and is formed to have a nonuniform wall thickness. As shown in FIG. 3, while the baffle plate 70 is fixedly disposed on the outer circumference of the differential device 20, the upper side in FIG. 3 of the main body 72 is a thick portion 72a having a large wall thickness. The thick portion of the main body 72 integrally includes a main-body-side oil passage portion 80d extending from the flange 74 toward a tip end 72b of the main body 72 which is on an opposite side of ring gear 48.

The baffle plate 70 integrally includes the oil passage component 80 forming outer wall portion of an oil passage 80a such that the oil passage component 80 functions as an oil passage 80a for guiding the lubricating oil for lubricating the pair of the pinion gears 56, 58 and the pair of the side gears 52, 54 of the differential device 20. The flange 74 of the baffle plate 70 integrally includes an annular oil passage portion 80c that is a portion of the oil passage component 80.

As shown in FIG. 4, the oil passage component 80 is formed to include the annular oil passage portion 80c and the main-body-side oil passage portion 80d and is integrally provided with the baffle plate 70. A side wall portion of the annular oil passage portion 80c which is at upper portion thereof and on the opposite side of the ring gear 48 and an end portion of the main-body-side oil passage portion 80d which is on the ring gear 48 side communicate with each other. As shown in FIG. 3, the annular oil passage portion 80c is bent along an inner circumferential shape of a bore of the main body 72 so that the annular oil passage portion 80c is formed into a substantially annular shape with a partially-cut circumference, i.e. "C" shape, and integrally included in the flange 74. A lubricating oil delivering portion 80e is formed at one end of the annular oil passage portion 80c, and the lubricating oil is supplied from a lubricating oil supply device not shown outside the baffle plate 70 through the lubricating oil delivering portion 80e to the oil passage 80a. The main-body-side oil passage portion 80d is formed to extend from a portion of the annular oil passage portion 80c toward the tip 72b of the main body 72 on the opposite side of the ring gear 48 and is integrally included in the main body 72. As shown in FIG. 3, in this example, the oil passage 80a in the annular oil passage portion 80c has a cross section formed into a substantially rectangular shape and the oil passage 80a in the main-body-side oil passage portion 80d has a cross section formed into a circular shape; however, for example, the oil passage 80a in the annular oil passage portion 80e and the oil passage 80a in the main-body-side oil passage portion 80d may both have a cross section formed into a circular shape.

The oil passage component 80 is provided with the opening portion 90 allowing the lubricating oil in the oil passage 80a to flow out vertically downward. A surrounded portion A of FIG. 5 shows a transparent view of the inside of the baffle plate 70 and specifically shows a main portion of the opening portion 90 formed in the oil passage component 80. As shown in FIG. 5, the opening portion 90 is disposed vertically above the pinion shaft 36 and between the opposite inner-circumferential-side end surfaces 56b, 58b of the pinion gears 56, 58 when the pinion shaft 36 is horizontal. FIG. 5 shows a state where the pinion shaft 36 is inclined about 15 degree relative to horizontal plane. Directions F1 and F2 shown in FIG. 5 indicate discharge directions of the lubricating oil supplied from the opening portion 90 to the differential device 20. The direction F1 is the discharge direction of the lubricating oil when the lubricating oil is injected from the opening portion 90, and the lubricating oil is supplied near substantially the center of the pinion shaft 36 in a longitudinal direction thereof. The direction F2 is the discharge direction of the lubricating oil when the lubricating oil is dripped down from the opening portion 90, and the lubricating oil is supplied to a position of the pinion shaft 36 between the pair of the inner-circumferential-side end surfaces 56b, 58b of the pinion gears 56, 58 facing each other. It is thought that the lubricating oil is dripped down from the opening portion 90, for example, when the lubricating oil has a higher viscosity at low temperature. The direction F2 is substantially the same direction as the vertical downward direction of the vehicle 10. As shown in FIGS. 3 and 5, the opening portion 90 is disposed on the center line of the pinion shaft 36 in a radial direction of the pinion shaft 36, i.e., a width direction of the pinion shaft 36. In this example, as shown in FIG. 5, when the through-hole 44b is located between the opening portion 90 and the rotation axis C3 of the differential case 44, a component serving as an obstruction for supplying the lubricating oil is not present, and therefore, the lubricating oil is efficiently supplied from the opening portion 90 to the differential device 20. The direction F1 in FIGS. 5 and 7 substantially corresponds to a direction of an axial center of an opening hole 90a described later.

Figure 6:
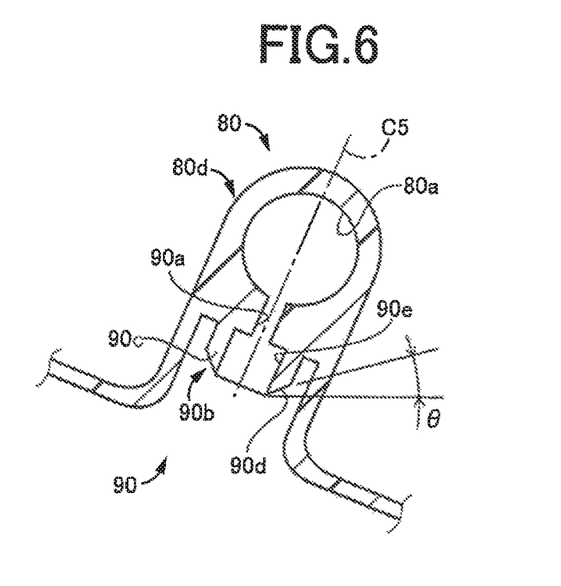
FIG. 6 is an enlarged cross-sectional view of a main portion of an opening portion shown in a surrounded portion A of FIG. 5.
Figure 7:
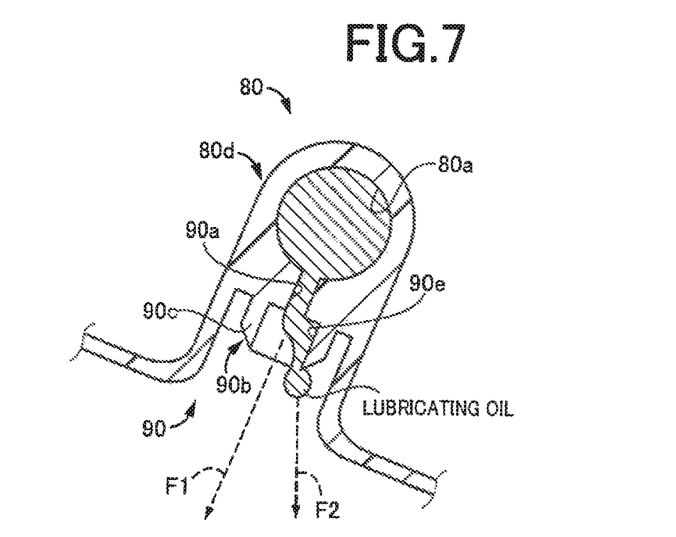
FIG. 7 is another enlarged cross-sectional view of the main portion of the opening portion shown in the surrounded portion A of FIG. 5.

FIGS. 6 and 7 are enlarged views of a main portion of the opening portion 90 shown in the surrounded portion A of FIG. 5. FIG. 6 shows a state in which the lubricating oil is not supplied to the oil passage 80a. The opening portion 90 is formed in the main-body-side oil passage portion 80d of the oil passage component 80 and includes an opening hole 90a communicating with the oil passage 80a. A hole diameter of the opening hole 90a is formed smaller than an inner diameter of the oil passage 80a. The opening portion 90 is provided with the guide 90b guiding in a predetermined direction the lubricating oil flowing out from the opening hole 90a. In this example, the guide 90b has a cylindrical projection 90c projecting in a direction of the axial center C5 of the opening hole 90a, and the cylindrical projection 90c is formed concentrically with the axial center line C5 of the opening hole 90a. The guide 90b is disposed vertically above the pinion shaft 36 and between the pair of the inner-circumferential-side end surfaces 56b, 58b of the pinion gears 56, 58 facing each other when the pinion shaft 36 is horizontal. The guide 90b is disposed within a width (diameter) of the pinion shaft 36, preferably on the center line of the pinion shaft 36 in the width direction of the pinion shaft 36 in a direction of rotation axis C3 of the differential case 44.

As shown in FIG. 6, an inner diameter of the cylindrical projection 90c is formed larger than the hole diameter of the opening hole 90a. A tip portion of the cylindrical projection 90c is formed into a tapered shape such that an outer diameter of the cylindrical projection 90c increases from the tip toward the opening hole 90a, i.e., a thickness dimension of the cylindrical projection 90c increases from the tip toward the opening hole 90a. Therefore, the opening portion 90 is formed into a so-called nozzle shape. As shown in FIG. 6, the tapered tip portion of the cylindrical projection 90c is provided with a tapered surface 90d such that an angle θ between the tapered surface 90d and the horizontal line is larger than 0 degrees while the baffle plate 70 and the differential device 20 are assembled to the vehicle 10. In FIG. 6, the angle θ is a positive angle in the counterclockwise direction from the horizontal line.

FIG. 7 shows a state in which the lubricating oil is supplied to the oil passage 80a and the lubricating oil flows out from the opening portion 90 and shows the state of the lubricating oil flowing out from the opening portion 90 at low temperature. Specifically, in the state shown in FIG. 7, since the lubricating oil has a higher viscosity at low temperature, a resistance increases in a pipeline from the lubricating oil delivering portion 80e through the oil passage 80a to the opening hole 90a, and therefore, for example, the lubricating oil is not injected toward the axial center direction of the opening hole 90a of the opening portion 90, so that the lubricating oil is dripped down along a wall surface of the guide 90b, i.e., a bore wall surface 90e of the cylindrical projection 90c. As shown in FIG. 7, when the lubricating oil has a higher viscosity at low temperature and is not injected from the opening portion 90, the lubricating oil is allowed to seep out along the bore wall surface 90e of the cylindrical projection 90c and dripped down in the direction F2 by the tapered tip portion of the cylindrical projection 90c. Since the cylindrical projection 90c is disposed above the pinion shaft 36 and between the inner-circumferential-side end surfaces 56b, 58b of the pinion gears 56, 58 when the pinion shaft 36 is horizontal as shown in FIG. 5, the lubricating oil dripped in the direction F2 is supplied to the pinion shaft 36. Therefore, if the lubricating oil has a higher viscosity at low temperature and a force of injection from the opening portion 90 to, for example, the pinion shaft 36, becomes smaller than a viscous resistance of the lubricating oil, the lubricating oil is dripped to the pinion shaft 36 between the pair of the inner-circumferential-side end surfaces 56b, 58b of the pinion gears 56, 58 due to the weight of the lubricating oil. The lubricating oil dripped to the pinion shaft 36 between the inner-circumferential-side end surfaces 56b, 58b of the pinion gears 56, 58 is supplied over the pinion shaft 36 between the pinion gears 56, 58 by a centrifugal force due to the rotation of the differential case 44 around the rotation axis C3.

As described above, according to this example, the vehicle power transmission device 12 has the oil passage component 80 integrally included in the baffle plate 70, and the oil passage component 80 is provided with the opening portion 90 allowing the lubricating oil in the oil passage 80a to flow out downward. The opening portion 90 is disposed above the pinion shaft 36 and between the pair of the inner-circumferential-side end surfaces 56b, 58b of the pinion gears 56, 58 facing each other when the pinion shaft 36 is horizontal. As a result, when the through-hole 44b is located between the opening portion 90 and the differential device 20, since no obstruction interfering with the supply of the lubricating oil exists therebetween, the vehicle power transmission device 12 can supply the lubricating oil to the differential device 20 without waste, and since the opening portion 90 is disposed above the pinion shaft 36 and between the pair of the inner-circumferential-side end surfaces 56b, 58b of the pinion gears 56, 58 when the pinion shaft 36 is horizontal, the lubricating oil can be allowed to flow out downward and supplied to the pinion shaft 36. Therefore, the vehicle power transmission device 12 can efficiently and stably supply the lubricating oil to the differential device 20.

According to this example, the oil passage component 80 is integrally included in the baffle plate 70. As a result, when the through-hole 44d is located between the opening portion 90 and the differential device 20, the vehicle power transmission device 12 has no obstruction interfering with the supply of the lubricating oil therebetween, and the oil passage component 80 is easily attached along with the baffle plate 70. Therefore, the assembly workability of the vehicle power transmission device 12 is improved, and the vehicle power transmission device 12 can supply the lubricating oil to the differential device 20 without waste.

According to this example, the baffle plate 70 and the oil passage component 80 are each made of a resin material. As a result, for example, even the baffle plate 70 and the oil passage component 80 having complicated shapes can inexpensively be formed as compared to metal materials, so that the vehicle power transmission device 12 can be reduced in cost.

According to this example, the opening portion 90 includes the opening hole 90a having a hole diameter smaller than the inner diameter of the oil passage 80a. As a result, the lubricating oil flowing through the oil passage 80a is injected from the opening hole 90a and supplied to the pinion shaft 36, so that the vehicle power transmission device 12 can reliably supply the lubricating oil to the pinion shaft 36.

According to this example, the opening portion 90 is provided with the guide 90b dripping the lubricating oil flowing out from the opening hole 90a, and the guide 90b is disposed vertically above the pinion shaft 36 and between the pair of the inner-circumferential-side end surfaces 56b, 58b of the pinion gears 56, 58 facing each other when the pinion shaft 36 is horizontal. As a result, the lubricating oil can more reliably be supplied to the pinion shaft 36 if the lubricating oil is not injected from the opening portion 90 so that the lubricating oil is dripped from the opening portion 90. Therefore, the vehicle power transmission device 12 can more efficiently and stably supply the lubricating oil to the differential device 20.

According to this example, if the lubricating oil is not injected from the opening portion 90 so that the lubricating oil is dripped from the opening portion 90, the lubricating oil is allowed to seep out along the bore wall surface 90e of the cylindrical projection 90c, and the lubricating oil is more reliably supplied by the tip portion of the tapered cylindrical projection 90c to the pinion shaft 36. Therefore, the vehicle power transmission device 12 can more efficiently and stably supply the lubricating oil to the differential device 20.

According to this example, the tapered tip portion of the cylindrical projection 90c is formed into the tapered surface such that an angle θ between the tapered surface and the horizontal line is larger than 0 degrees while the baffle plate 70 and the differential device 20 are assembled to the vehicle 10. As a result, the vehicle power transmission device 12 can supply the lubricating oil to the pinion shaft 36 by dripping the oil more reliably onto the pinion shaft 36 without causing the lubricating oil to run along the periphery of the outer circumference of the cylindrical projection 90c.

Although the preferred example of the present invention has been described in detail with reference to the drawings, the present invention is also applicable in other forms.

For example, although the opening portion 90 is formed in the main-body-side oil passage portion 80d of the oil passage component 80 in the example, the present invention is not necessarily limited thereto, and the opening portion 90 may be formed in the annular oil passage portion 80c of the oil passage component 80, for example.

Although the opening portion 90 is disposed on the center line of the pinion shaft 36 in the radial direction of the pinion shaft 36, i.e., the width direction of the pinion shaft 36, in the example, the present invention is not necessarily limited thereto and, for example, the opening portion 90 may be disposed within the width dimension of the pinion shaft 36 in the width direction of the pinion shaft 36. At least the guide 90b of the opening portion 90 may be disposed on the center line of the pinion shaft 36 or within the width dimension of the pinion shaft 36 in the width direction of the pinion shaft 36.

Although the inner diameter of the cylindrical projection 90c is formed larger than the hole diameter of the opening hole 90a in the example, the present invention is not necessarily limited thereto and, for example, the inner diameter of the cylindrical projection 90c may be the same as the hole diameter of the opening hole 90a.

Although the tip portion of the cylindrical projection 90c is formed into a tapered shape having an outer diameter increasing from the tip toward the opening hole 90a in the example, the present invention is not necessarily limited thereto and, for example, the tip portion of the cylindrical projection 90c may be formed into a tapered shape having an outer diameter and an inner diameter increasing from the tip toward the opening hole 90a or may be formed into a tapered shape having an inner diameter increasing from the tip toward the opening hole 90a. Therefore, the lubricating oil only needs to be dripped down between the inner-circumferential-side end surfaces 56b, 58b of the pinion gears 56, 58 by the tapered tip portion of the cylindrical projection 90c, for example, when the lubricating oil has a higher viscosity at low temperature.

Although the guide 90b has the cylindrical projection 90c projecting in the direction of the axial center C5 of the opening hole 90a in the example, the present invention is not necessarily limited thereto and, for example, the guide 90b may be a projection projecting in the direction of the axial center C5 of the opening hole 90a and having a cross section in an elongated hole shape or a rectangular shape.

Although the examples of the present invention have been described in detail with reference to the drawings, the examples described above are merely an embodiment and the present invention can be implemented in variously modified and improved forms based on the knowledge of those skilled in the art without departing from the spirit thereof.

REFERENCE SIGNS LIST

12: Vehicle power transmission device
20: Differential device (Differential mechanism)
36: Pinion shaft
44: Differential case
52, 54: Side gear
56, 58: Pinion gear
56b, 58b: Inner-circumferential-side end surface
70: Baffle plate
80: Oil passage component
80a: Oil passage
90: Opening portion
90a: Opening hole
90b: Guide
90c: Cylindrical projection
90d: Tapered surface

What is claimed is:

1. A vehicle power transmission device comprising:
a differential mechanism including a differential case rotatably disposed around a rotation axis and provided with a through-hole in an outer circumferential surface, a pair of pinion gears respectively fitted to both ends of a pinion shaft fixed to the differential case, and a pair of side gears rotatably supported by the differential case and meshed with the pinion gears; and
a baffle plate that includes an oil passage component functioning as an oil passage for supplying a lubricating oil for lubricating the pinion gears and the side gears and that is fixedly disposed to cover an outer circumference of the differential case, wherein
the oil passage component is provided with an opening portion allowing the lubricating oil in the oil passage to flow out downward,
the opening portion is disposed above the pinion shaft and between a pair of inner-circumferential-side end surfaces of the pair of the pinion gears when the pinion shaft is horizontal,
the opening portion includes an opening hole, a hole diameter of the opening hole being smaller than an inner diameter of the oil passage,
the opening portion is provided with a guide dripping the lubricating oil flowing out from the opening hole,
the guide is disposed above the pinion shaft and between the inner-circumferential-side end surfaces of the pinion gears when the pinion shaft is horizontal, and
the guide has a cylindrical projection projecting in a direction of an axial center line of the opening hole.

2. The vehicle power transmission device according to claim 1, wherein the oil passage component is integrally included in the baffle plate.

3. The vehicle power transmission device according to claim 2, wherein the baffle plate and the oil passage component are each made of a resin material.

4. The vehicle power transmission device according to claim 3, wherein the cylindrical projection has a tip portion of the cylindrical projection is formed into a tapered shape with a thickness dimension increasing from a tip toward the opening hole.

5. The vehicle power transmission device according to claim 4, wherein
the tapered tip portion of the cylindrical projection is formed into a tapered surface having a minimum angle to be larger than 0 degrees relative to a horizontal line while the baffle plate and the differential mechanism are assembled to a vehicle.

6. The vehicle power transmission device according to claim 2, wherein a tip portion of the cylindrical projection is formed into a tapered shape with a thickness dimension increasing from a tip toward the opening hole.

7. The vehicle power transmission device according to claim 6, wherein
the tapered tip portion of the cylindrical projection is formed into a tapered surface having a minimum angle to be larger than 0 degrees relative to a horizontal line while the baffle plate and the differential mechanism are assembled to a vehicle.

8. The vehicle power transmission device according to claim 1, wherein the baffle plate and the oil passage component are each made of a resin material.

9. The vehicle power transmission device according to claim 8, wherein the cylindrical projection has a tip portion of the cylindrical projection is formed into a tapered shape with a thickness dimension increasing from a tip toward the opening hole.

10. The vehicle power transmission device according to claim 9, wherein
the tapered tip portion of the cylindrical projection is formed into a tapered surface having a minimum angle to be larger than 0 degrees relative to a horizontal line while the baffle plate and the differential mechanism are assembled to a vehicle.

11. The vehicle power transmission device according to claim 1, wherein a tip portion of the cylindrical projection is formed into a tapered shape with a thickness dimension increasing from a tip toward the opening hole.

12. The vehicle power transmission device according to claim 11, wherein
the tapered tip portion of the cylindrical projection is formed into a tapered surface having a minimum angle to be larger than 0 degrees relative to a horizontal line while the baffle plate and the differential mechanism are assembled to a vehicle.

* * * * *